(12) United States Patent
Wade et al.

(10) Patent No.: US 10,330,053 B2
(45) Date of Patent: Jun. 25, 2019

(54) PULSE SEPARATED DIRECT INLET AXIAL AUTOMOTIVE TURBINE

(71) Applicant: Ford Global Technologies, LLC, Dearborn, MI (US)

(72) Inventors: Robert Andrew Wade, Plymouth, MI (US); John Christopher Riegger, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 598 days.

(21) Appl. No.: 13/935,271

(22) Filed: Jul. 3, 2013

(65) Prior Publication Data

US 2015/0007800 A1  Jan. 8, 2015

(51) Int. Cl.
| | |
|---|---|
| *F02C 6/12* | (2006.01) |
| *F02F 1/42* | (2006.01) |
| *F01N 13/10* | (2010.01) |
| *F02B 37/18* | (2006.01) |
| *F02M 26/14* | (2016.01) |

(52) U.S. Cl.
CPC ............. *F02M 26/14* (2016.02); *F01N 13/10* (2013.01); *F02B 37/18* (2013.01); *F02C 6/12* (2013.01); *F02F 1/4264* (2013.01); *F02F 2001/4278* (2013.01); *F05D 2220/40* (2013.01); *Y02T 10/144* (2013.01)

(58) Field of Classification Search
USPC ........ 123/559.1, 568.14; 60/792, 600, 605.1, 60/605.2, 607, 610, 622, 280, 281, 312, 60/313, 323, 324, 694, 697, 602, 321, 60/322
See application file for complete search history.

(56) References Cited

U.S. PATENT DOCUMENTS

| | | | | |
|---|---|---|---|---|
| 3,524,315 A | * | 8/1970 | Grunach | ................. F01N 13/10 60/323 |
| 3,786,630 A | | 1/1974 | Kuhn et al. | |
| 4,463,564 A | | 8/1984 | McInerney | |
| 4,621,494 A | | 11/1986 | Fujita | |
| 5,713,200 A | | 2/1998 | Baets et al. | |
| 5,787,709 A | * | 8/1998 | Watanabe | ............... F01N 13/10 60/313 |
| 6,199,376 B1 | * | 3/2001 | Maeda | .................... F01N 13/08 60/313 |
| 6,463,641 B2 | | 10/2002 | Bassani | |
| 7,924,375 B2 | | 4/2011 | Chung et al. | |
| (Continued) | | | | |

OTHER PUBLICATIONS

Wade, Robert Andrew, "Direct Inlet Axial Automotive Turbine," U.S. Appl. No. 13/935,255, filed Jul. 3, 2013, 28 pages.

*Primary Examiner* — Grant Moubry
*Assistant Examiner* — Ruben Picon-Feliciano
(74) *Attorney, Agent, or Firm* — Julia Vouturas; McCoy Russell LLP (57) ABSTRACT

Systems and methods for operating a turbocharged engine are described. In one example, a system comprises a cylinder head having a first and second exhaust duct separately coupled to first and second groups of cylinders, each of the first and second exhaust ducts leading to an exhaust driven turbine mounted inside the cylinder head on a bearing, the bearing located within a bearing housing supported by the cylinder head. In this way, exhaust pulses remain separate up to the turbine mounted inside the cylinder head.

21 Claims, 7 Drawing Sheets

(56) References Cited

U.S. PATENT DOCUMENTS

| | | | |
|---|---|---|---|
| 8,051,648 B2 | 11/2011 | Son et al. | |
| 2010/0180592 A1* | 7/2010 | Williams | F01D 17/165 60/602 |
| 2010/0206265 A1* | 8/2010 | Yamagata | F01N 13/10 123/337 |
| 2011/0173972 A1* | 7/2011 | Wade | F01N 13/10 60/602 |
| 2011/0302917 A1 | 12/2011 | Styles et al. | |

\* cited by examiner

PULSE SEPARATED DIRECT INLET AXIAL AUTOMOTIVE TURBINE

BACKGROUND AND SUMMARY

Turbocharging an internal combustion engine can reduce external emissions and increase the specific power output of the engine, as exhaust departing from the engine cylinders may be directed through a turbine and the resulting energy used to power a compressor. One example configuration integrates the exhaust ports leading from the engine cylinders as well as the turbine housing into the cylinder head itself.

The inventors herein have recognized that achieving exhaust pulse separation enables an exhaust cam duration beneficial to improving fuel consumption, improving low engine speed torque, and achieving better specific power output that current designs. A turbine integrated into the cylinder head will simultaneously reduce cost and decrease the engine footprint. For example, an integrated turbine may decrease the overall size of the system while increasing the efficiency of the engine and the specific power. An integrated axial turbine may also have a faster transient response than a corresponding radial turbine. However, to maintain efficient combustion with long exhaust cam events, residual exhaust gas must be prevented from entering the engine cylinders during an exhaust blowdown event when multiple exhaust valves are open. This is accomplished with full pulse separation of the exhaust gas up to the point where the exhaust gas enters the turbine. In an I-4 engine with a conventional firing order, for example, this may be accomplished by joining the exhaust ports exiting cylinders 1 and 4 together into a first exhaust duct and joining the exhaust ports exiting cylinders 2 and 3 together into a second exhaust duct. The outlets of the two ducts may be connected to the inlet of the turbine.

However, the inventors have also recognized that the current manifold designs that achieve full pulse separation are targeted to radial turbines and may not be applicable to systems that use axial turbines. Incorporating such manifolds may require an external turbocharger, which would increase cost and have a worse transient response.

The above issues may be at least partially addressed, in one example, by a system comprising a cylinder head having a first and second exhaust duct separately coupled to first and second groups of cylinders, each of the first and second exhaust ducts leading to an exhaust driven turbine mounted inside the cylinder head on a bearing, the bearing located within a bearing housing supported by the cylinder head.

In this way, the system may allow pulse separation of exhaust gas exiting the cylinders all the way to an inlet of a turbine, while maintaining a compact configuration. Separating exhaust gas pulses in this way may result in an increase in the efficiency of exhaust gas delivery to a turbine.

Further, the outlets of each of the first and second ducts may form a semi-circular cross-sectional coupling with a gas collector of the turbine, and the two semi-circular cross-sections of each of the first and second outlets may be positioned relative to one another to form an annular combined outlet. In this way, the stator and rotor stages of an axial turbine may be inserted into the opening created in the cylinder head.

In another example, a turbocharged engine comprising a cylinder head forming two or more exhaust ducts, each with an outlet terminus at a turbine wheel or collector, an opening of the outlet terminus of a first exhaust duct being a semi-circular annular shape and an opening of the outlet terminus of a second exhaust output line being a semi-circular annular shape, the outlet termini positioned opposite one another to form a circular annulus. Further, the first exhaust duct may be coupled to outer engine cylinders, and the second exhaust duct may be coupled to inner engine cylinders. In this way, pulse separation may be achieved up to a turbine inserted into the cylinder head within the circular annulus.

In another example, a method, comprising combining, in a cylinder head, exhaust gas from inner inline cylinders of an engine to a first semi-circular annular exit, combining, in the cylinder head, exhaust gas from outer inline cylinders of an engine to a second semi-circular annular exit positioned opposite the first semi-circular annular exit, and directing exhaust gas out of the first and second exits through an axial turbine with bearings mounted in the cylinder head. This method may further comprise adjusting a wastegate valve to adjust flow through a wastegate line positioned in the cylinder head. In this way, the flow of exhaust gas may be controlled within the cylinder head to achieve optimal engine performance.

In other embodiments, the exhaust ducts may enter a turbine collector at a variety of angles to the turbine to achieve the desired relative gas velocity. The outlet terminus of the exhaust ducts may be arranged to cover any variety of sectors of the turbine ranging from half of the turbine circumference to a very small portion of the turbine circumference. This sector configuration may include a unique sector for each cylinder or for groups of cylinders. In this way, pulse separation may be achieved all the way to the turbine collector without combining exhaust pulses.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any of the disadvantages noted above or in any part of this disclosure.

BRIEF DESCRIPTION OF FIGURES

FIGS. 2A, 2B, 3 and 5A-B are drawn approximately to scale, but other dimensions may be used.

DETAILED SPECIFICATION

Figure 1:
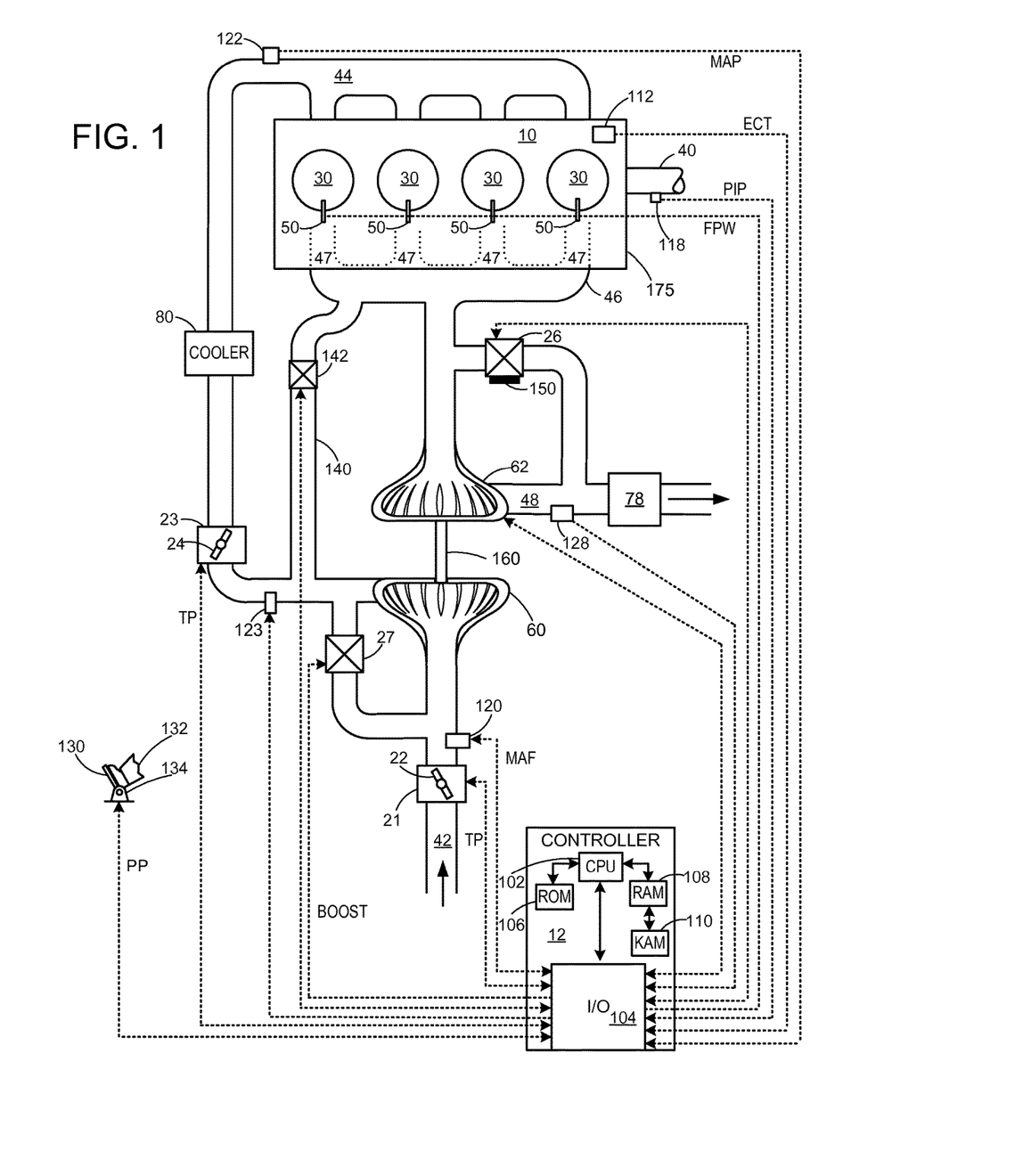
FIG. 1 shows a schematic diagram of a turbocharged engine in accordance with the present disclosure.

The following description relates to systems and methods for operating an engine including a turbocharger system, for example as shown in FIG. 1.

FIG. 1 is a schematic diagram showing an example engine 10, which may be included in a propulsion system of an automobile. The engine 10 includes cylinder head 175, which is shown with four cylinders 30. However, other numbers of cylinders may be used in accordance with the current disclosure. Engine 10 may be controlled at least partially by a control system including controller 12, and by input from a vehicle operator 132 via an input device 130. In this example, input device 130 includes an accelerator pedal and a pedal position sensor 134 for generating a proportional pedal position signal PP. Each combustion chamber (e.g., cylinder) 30 of engine 10 may include combustion chamber walls with a piston (not shown) positioned therein. The pistons may be coupled to a crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel to enable a starting operation of engine 10.

Combustion chambers 30 may receive intake air from intake manifold 44 via intake passage 42 and may exhaust combustion gases via exhaust passage 48. Intake manifold 44 and exhaust manifold 46 can selectively communicate with combustion chamber 30 via respective intake valves and exhaust valves (not shown). In some embodiments, combustion chamber 30 may include two or more intake valves and/or two or more exhaust valves.

Fuel injectors 50 are shown coupled directly to combustion chamber 30 for injecting fuel directly therein in proportion to the pulse width of signal FPW received from controller 12. In this manner, fuel injector 50 provides what is known as direct injection of fuel into combustion chamber 30. The fuel injector may be mounted in the side of the combustion chamber or in the top of the combustion chamber, for example. Fuel may be delivered to fuel injector 50 by a fuel system (not shown) including a fuel tank, a fuel pump, and a fuel rail. In some embodiments, combustion chambers 30 may alternatively, or additionally, include a fuel injector arranged in intake manifold 44 in a configuration that provides what is known as port injection of fuel into the intake port upstream from each combustion chamber 30.

Intake passage 42 may include throttle 21 and 23 having throttle plates 22 and 24, respectively. In this particular example, the position of throttle plates 22 and 24 may be varied by controller 12 via signals provided to an actuator included with throttles 21 and 23. In one example, the actuators may be electric actuators (e.g., electric motors), a configuration that is commonly referred to as electronic throttle control (ETC). In this manner, throttles 21 and 23 may be operated to vary the intake air provided to combustion chamber 30 among other engine cylinders. The position of throttle plates 22 and 24 may be provided to controller 12 by throttle position signal TP. Intake passage 42 may further include a mass air flow sensor 120 and a manifold air pressure sensor 122 for providing respective signals MAF (mass airflow) and MAP (manifold air pressure) to controller 12.

Exhaust passage 48 may receive exhaust gases from cylinders 30. Cylinders 30 may be coupled to exhaust passage 48 through a plurality of valves and ports described further below and in reference to FIG. 3. The plurality of valves may open to allow exhaust to exit cylinders 30 and enter exhaust ports 47, which further direct exhaust gas to exhaust passage 48. In the example depicted in FIG. 1, the exhaust ports 47 are located inside of cylinder head 175. It will be appreciated that such a conformation may be referred to as an "integrated exhaust manifold" wherein exhaust manifold 46 is located inside cylinder head 175.

Exhaust gas sensor 128 is shown coupled to exhaust passage 48 upstream of emission control device 78. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO, a NOx, HC, or CO sensor, for example. Emission control device 78 may be a three way catalyst (TWC), NOx trap, various other emission control devices, or combinations thereof. Exhaust temperature may be measured by one or more temperature sensors (not shown) located in exhaust passage 48. Alternatively, exhaust temperature may be inferred based on engine operating conditions such as speed, load, air-fuel ratio (AFR), spark retard, etc.

Controller 12 is shown in FIG. 1 as a microcomputer, including microprocessor unit 102, input/output ports 104, an electronic storage medium for executable programs and calibration values shown as read-only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses for each revolution of the crankshaft 40. In some examples, storage medium read-only memory 106 may be programmed with computer readable data representing instructions executable by processor 102 for performing the methods described below as well as other variants that are anticipated but not specifically listed.

Engine 10 may further include a compression device such as a turbocharger or supercharger including at least a compressor 60 arranged upstream of intake manifold 44. For a turbocharger, compressor 60 may be at least partially driven by a turbine 62, via, for example shaft 160, or other coupling arrangement. The turbine 62 may be couple exhaust manifold 46 to exhaust passage 48, for example via an integrated exhaust manifold, as described above. Various arrangements may be provided to drive the compressor. For a supercharger, compressor 60 may be at least partially driven by the engine and/or an electric machine, and may not include a turbine. Thus, the amount of compression provided to one or more cylinders of the engine via a turbocharger or supercharger may be varied by controller 12. In some cases, the turbine 62 may drive, for example, an electric generator, to provide power to a battery via a turbo driver. Power from the battery may then be used to drive the compressor 60 via a motor. Further, a sensor 123 may be disposed in intake manifold 44 for providing a BOOST signal to controller 12.

Further, exhaust passage 48 may include wastegate 26 for diverting exhaust gas away from turbine 62. In some embodiments, wastegate 26 may be a multi-staged wastegate, such as a two-staged wastegate with a first stage configured to control boost pressure and a second stage configured to increase heat flux to emission control device 78. Wastegate 26 may be operated with an actuator 150, which, for example, may be an electric actuator including permanent magnets. In various embodiments, actuator 150 may be an electric motor, a pressure controlled actuator or a vacuum controlled actuator. Additional detail regarding wastegate 26 and actuator 150 will be presented below. Intake passage 42 may include a compressor bypass valve 27 configured to divert intake air around compressor 60. Wastegate 26 and/or compressor bypass valve 27 may be controlled by controller 12 via actuators (e.g., actuator 150) to be opened when a lower boost pressure is desired, for example.

Intake passage 42 may further include charge air cooler (CAC) 80 (e.g., an intercooler) to decrease the temperature of the turbocharged or supercharged intake gases. In some embodiments, charge air cooler 80 may be an air to air heat exchanger. In other embodiments, charge air cooler 80 may be an air to liquid heat exchanger.

An exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Further, an EGR sensor (not shown) may be arranged within the EGR passage and may provide an indication of one or more of pressure, temperature, and concentration of the exhaust gas. Alternatively, the EGR may be controlled through a calculated value based on signals from the MAF sensor (upstream), MAP (intake manifold), MAT (manifold gas temperature) and the crank speed sensor. Further, the EGR may be controlled based on an exhaust $O_2$ sensor and/or an intake oxygen sensor (intake manifold). Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger. In other embodiments, the engine may additionally or alternatively include a low pressure EGR system where EGR is routed from downstream of a turbine of a turbocharger to upstream of a compressor of the turbocharger.

Figure 2A:
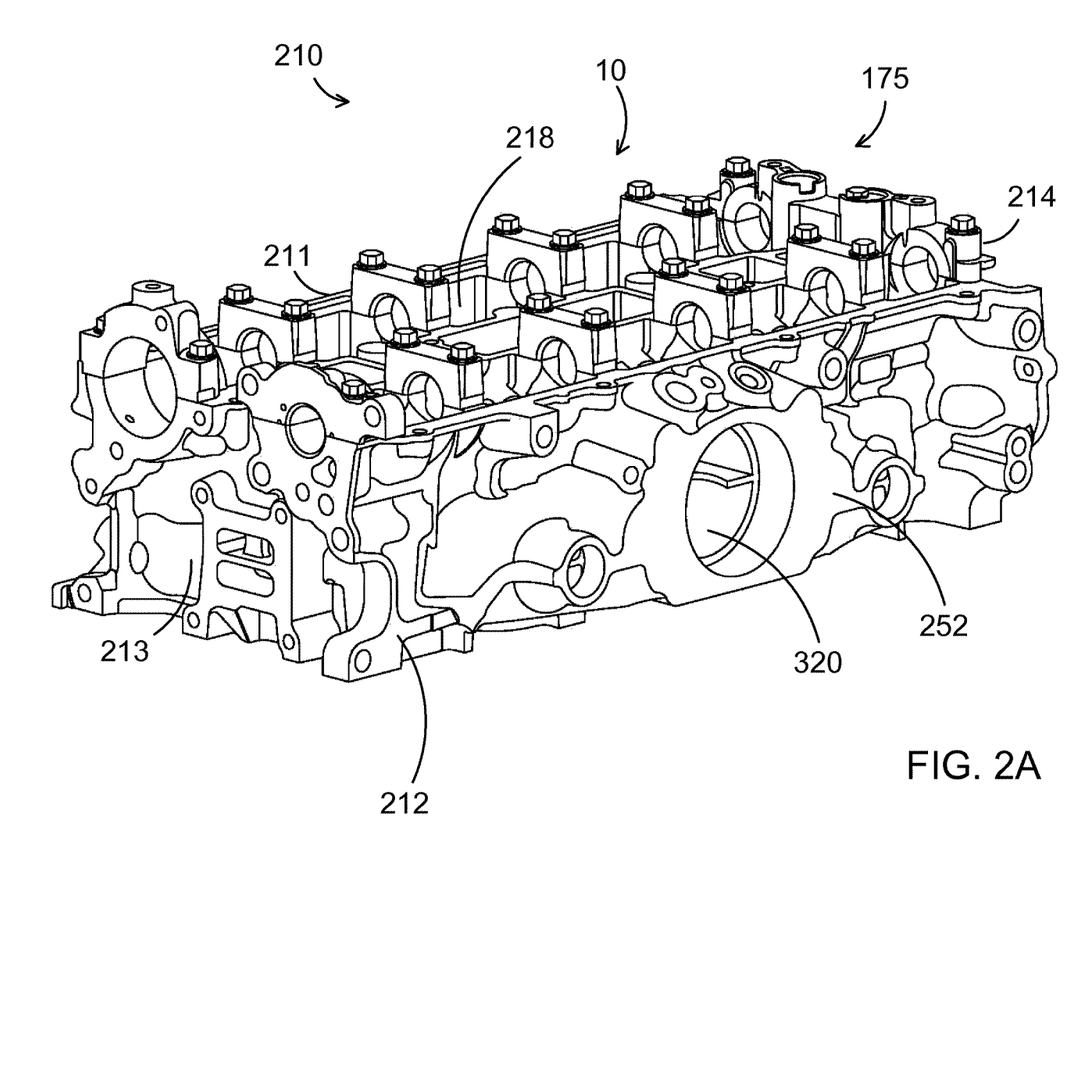
FIG. 2A shows a perspective view of a cylinder head in accordance with the present disclosure.
Figure 2B:
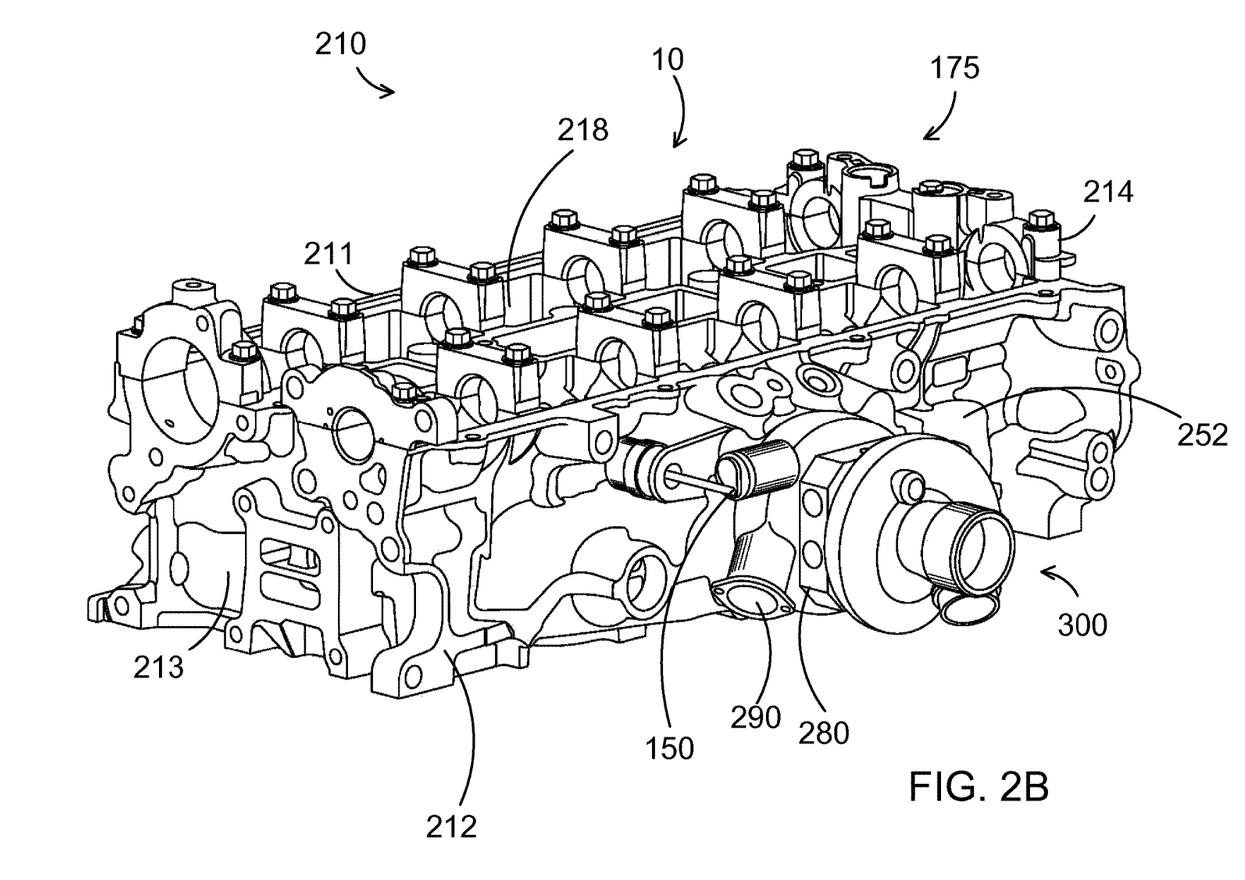
FIG. 2B shows a perspective view of a cylinder head coupled to a bearing housing.

FIG. 2A shows a perspective view of a cylinder assembly 210 in accordance with the present disclosure. FIG. 2B shows a perspective view of the cylinder assembly 210 depicted in FIG. 2A coupled to turbocharger 300. Cylinder assembly 210 includes cylinder head 175 which may attach to a cylinder block (not shown) which includes a plurality of combustion chambers (e.g., cylinders) 30 of engine 10 that may each include combustion chamber walls with a piston (not shown) positioned therein. The cylinders may be positioned in an inline configuration such that the cylinders are aligned along the central axis of the cylinder head. Alternatively, the cylinders may be aligned in a V-configuration, a flat configuration or other suitable configuration. When attached to a cylinder block, the depicted cylinder head 175 may form 4 cylinders. In another example, the cylinder assembly may utilize an alternate number of cylinders, such as 3 cylinders. Cylinder head 175 may be cast out of a suitable material such as iron or aluminum. The cylinder head may include numerous components not depicted in this example perspective, including camshafts, intake and exhaust valves, spark plugs, fuel injectors 50, temperature sensor 112, other suitable mechanical components and other suitable sensors and actuators, such as shown in FIG. 1, for example.

As depicted, cylinder head 175 includes four perimeter walls. The walls include a first side wall 211, a second side wall 212, a rear end wall 213, and a front end wall 214. First sidewall 211 may be configured as the intake side of the cylinder head cooperating with intake valves of the engine, and may include components such as valves and ports as needed to interface with intake manifold 44 and to allow or restrict the flow of intake air into the cylinder head. Front end wall 214 may include components as needed to interface with crankshaft 40 and to allow the coupling of crankshaft 40 to the pistons included in cylinder head 175. Second side wall 212 may be configured as the exhaust side of the cylinder head cooperating with exhaust valves of the engine and may include components such as one or more mounting bolt boss 252 or other suitable devices for mounting bearing housing 280 directly to the cylinder head. In this example configuration, the turbocharger assembly may be directly coupled to the cylinder head. Alternatively, the turbocharger assembly may be indirectly coupled to the cylinder head. The turbocharger assembly and possible configurations thereof are discussed further below and with regard to FIG. 3. Cylinder head 175 may also include a plurality of cylinder closure portions 218.

Cylinder head 175 may include one or more cooling jackets. For example, a first cooling jacket may be located between exhaust manifold 46 and the interface between cylinder head 175 and the cylinder block. A second cooling jacket may be located on the opposite side of the exhaust manifold as the first cooling jacket. The first and second cooling jackets may be coupled together by a flow passage. In some examples, the first and second cooling jackets may be coupled to a turbine cooling jacket through a flow passage. In another example, the first and second cooling jackets may be separate and operate with different coolants or different supplies of the same coolant. In another example, a first cooling jacket may be located on the intake side of the plurality of cylinders, and a second cooling jacket located on the exhaust side of the cylinders. The two cooling jackets may have substantially different cooling capacities, and may be coupled to a cooling water system including a radiator, coolant pump driven by the engine, thermostat, etc. In one example, a cooling jacket located on the exhaust side of the cylinders may have a higher cooling capacity than the cooling jacket on the intake side of the cylinders, for example via a higher flow rate, increased surface area, etc. In another example, the cooling jacket located on the intake side of the cylinders may have a higher cooling capacity than the cooling jacket on the exhaust side of the cylinders.

Cylinder head 175 includes an exhaust manifold 46. The components of the exhaust manifold will be discussed further below and with regard to FIGS. 3, 5A and 5B, and include a plurality of exhaust ports 47 coupled to cylinders 30, and a plurality of exhaust ducts 310 coupled to exhaust ports 47. Exhaust ducts 310 may discharge exhaust gas into exhaust collector 320. Each cylinder may have an intake and exhaust valve. In some cases, each cylinder may include two or more intake valves and two or more exhaust valves. Each intake valve and exhaust valve may be operated by an intake cam and an exhaust cam, respectively. In another example, the intake and exhaust valves may be actuated by a valve coil and armature assembly.

One or more of exhaust ducts 310 may be further configured to include a wastegate 26 (not shown). Alternatively, wastegate 26 may be included in exhaust collector 320. Wastegate 26 may be configured to control the amount of exhaust gas that bypasses the turbine. Wastegate 26 may be actuated by wastegate actuator 150. Wastegate actuator 150 may be mounted onto cylinder head 175 or onto bearing housing 280. The wastegate may be actuated in response to the pressure in exhaust collector 275 exceeding a threshold as measured by a pressure sensor (nor shown) or in response to MAP sensor measurements above the required value to deliver the desired torque. Wastegate actuator 150 may be activated or deactivated in response to signals sent by controller 12. Activation of wastegate 26 allows exhaust gas to enter exhaust outlet 290 and further to an exhaust bypass line (not shown), allowing the exhaust gas to bypass the turbocharger assembly. Exhaust outlet 290 may be included in bearing housing 280. The wastegate passage may have an entry coupled to the cylinder head and an exit coupled to a hot gas collector within the bearing housing.

Bearing housing 280 may be attached to cylinder head 175 via mounting bolts 250 and mounting bolt boss 252, or through other appropriate attachment devices. As depicted in FIG. 2B, the direct coupling of bearing housing 280 to cylinder head 175 in this configuration allows for turbine 62 to be situated proximal to exhaust collector 320, allowing for conservation of exhaust gas energy within engine 10. As discussed further below and in regards to FIG. 3, this example configuration may allow for some of the components of the turbocharger assembly, such as the rotor stage and stator stage to be directly coupled to the cylinder head, minimizing the amount of space taken up by the turbocharger assembly. Bearing housing 280 may include other components as needed for mounting components of the turbocharger assembly or components as needed to mount additional sensors or actuators. For example a mounting boss for an exhaust gas oxygen sensor may be included in bearing housing 280.

Figure 3:
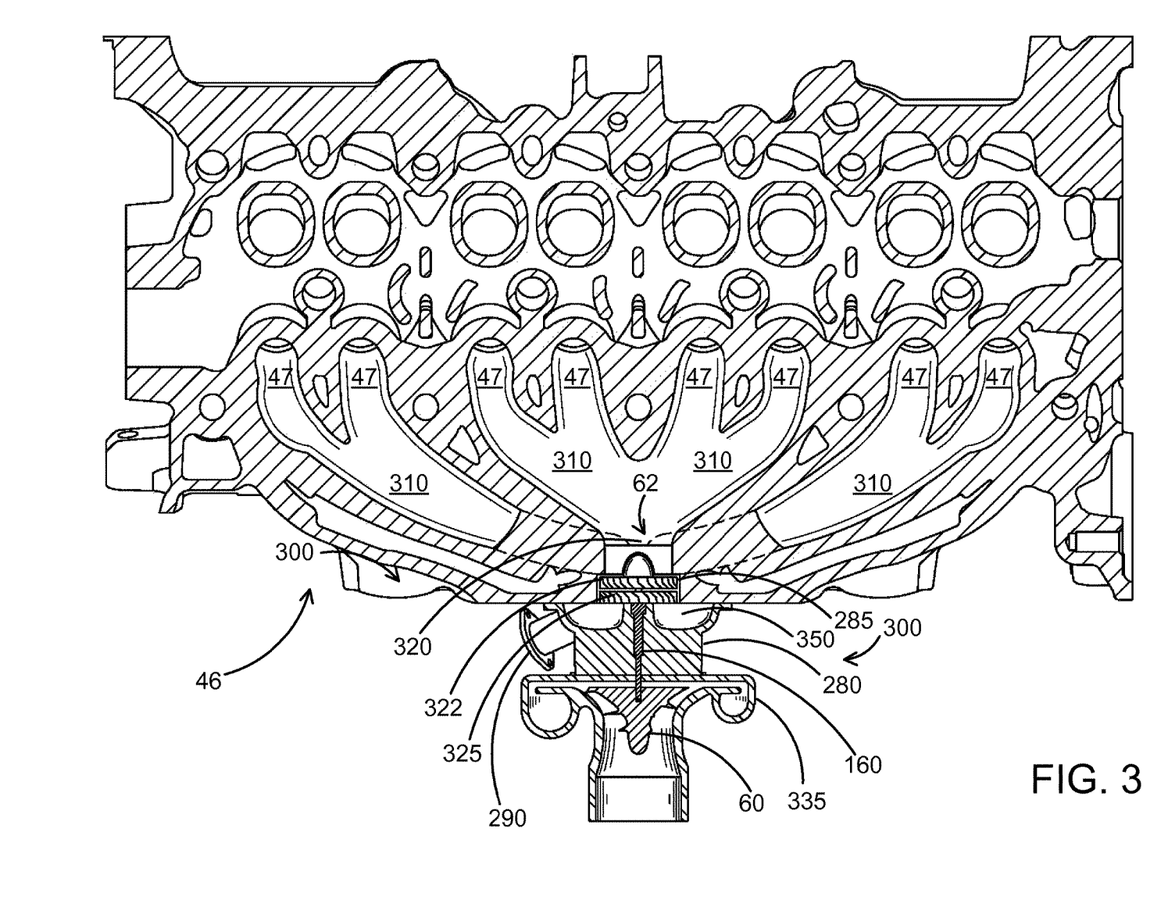
FIG. 3 shows a perspective view of an exhaust manifold and turbocharger assembly.
Figure 4:
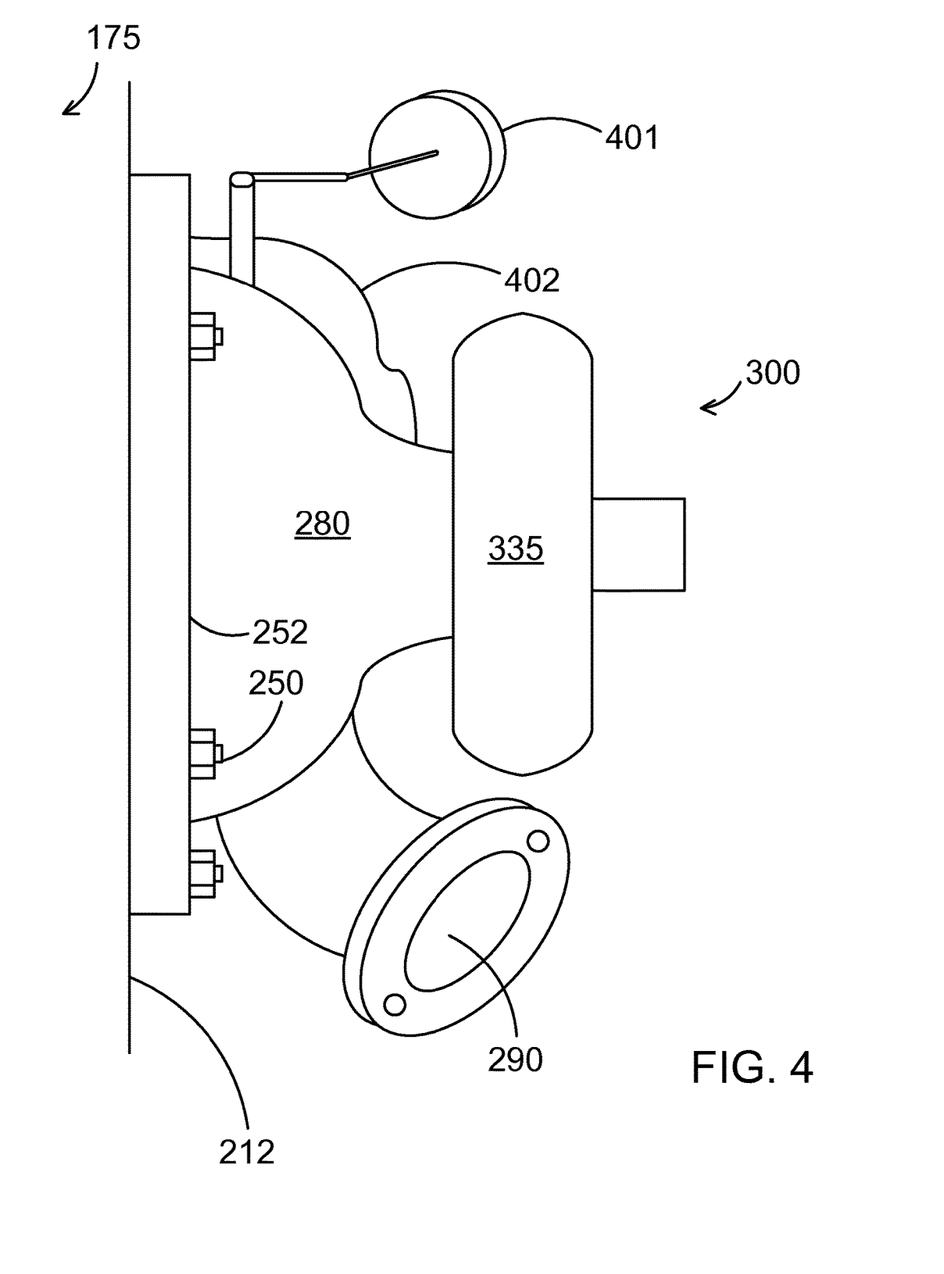
FIG. 4 shows a perspective view of a turbocharger assembly equipped with an oil and coolant supply.

FIGS. 3 and 4 show perspective views of the turbocharger assembly in accordance with the current disclosure. FIG. 3 shows a perspective view of exhaust ports 47 and exhaust ducts 310 and turbocharger assembly 300 in accordance with the current disclosure. FIG. 3 shows an example integrated exhaust manifold 46 for a 4 cylinder engine, but may include fewer or additional cylinders, for example 2, 3, 5 or 6 cylinders. FIG. 4 shows a side view of the turbocharger assembly 300 in accordance with the present disclosure. Exhaust manifold 46 may be included in cylinder head 175 as depicted in FIG. 2. Each cylinder 30 may have one or more exhaust valves coupled between the cylinder and an exhaust port 47. Exhaust ports 47 may be coupled to exhaust ducts 310. The exhaust ports receive exhaust gas released from the cylinders during engine operation. An exhaust runner may be formed at the merger of exhaust ports from adjacent cylinders or from cylinders that are not adjacent. For example, in an I4 engine configuration, it may be advantageous to merge exhaust ports from cylinders 2 and 3 into a first exhaust runner and to merge exhaust ports from cylinders 1 and 4 into a second exhaust runner. This configuration may allow for exhaust pulse separation to be maintained for this example engine configuration.

Exhaust ducts 310 may terminate into one or more openings at the mouth of exhaust collector 320. One or more exhaust runners may also include a wastegate passage 26 as described above. Under a condition where exhaust pressure in exhaust collector 320 exceeds a predetermined threshold, controller 12 may activate wastegate actuator 150, allowing exhaust gas to flow through wastegate 26 and into exhaust outlet 290, where it may be routed through an exhaust bypass line, bypassing the turbocharger assembly.

In another example, one or more exhaust ducts 310 may direct exhaust gas back to intake manifold 44 for re-entry to engine 10 as part of a dedicated exhaust gas recirculation system. In yet another example, a valve or other switching mechanism may divert exhaust gas flow from one or more exhaust ducts 310 to intake manifold 44 under a first condition, and to exhaust gas collector 320 under a second condition.

Exhaust gas collector 320 may be included in bearing housing 280. In another example, the exhaust gas collector may be included in cylinder head 175. In yet another example, the exhaust gas collector may be a separate component coupled between the cylinder head and bearing housing, or may be composed of portions of both the cylinder head and bearing housing. Exhaust gas may be directed from exhaust gas collector 320 to turbocharger assembly 300.

Turbocharger assembly 300 may include bearing housing 280, turbine housing 285, turbine 62, compressor housing 335, compressor 60, as well as components thereof, some of which are discussed further below and in regard to FIG. 4. Exhaust gas collector 320 may be fabricated as a part of bearing housing 280 or may be fabricated separately. In the example system depicted in FIGS. 3 and 4, turbine 62 is an axial turbine, but may also be a radial turbine or a mixed flow turbine. The turbine may be of a single stage or of multiple stages. The stator may also be of single or multiple stages. For an axial turbine, the flow of exhaust gas approaching the turbine rotor blades may be described as running substantially axially. Herein, "substantially axially" is used to mean that the flow of exhaust gas through the turbine is parallel to the turbine shaft. The exhaust inlet may be configured to direct exhaust gas in a substantially axial direction to the turbine. In another example, turbine 62 may be configured to be a radial turbine, where the flow of exhaust gas approaching the turbine rotor blades runs substantially radially, and where the exhaust inlet is configured to direct exhaust gas in a direction substantially perpendicular to the turbine shaft. In another example, the exhaust gas may approach the turbine in a geometry between axial and radial, e.g. a mixed flow turbine.

Bearing housing 280 may be fabricated from cast iron or other suitable materials that have a high thermal distortion resistance, or other materials suitable for exposure to the high temperatures experienced during engine operation. Turbine stator 322 may be fabricated by welding sheets of stamped metal into appropriate shapes and configurations, or may be fabricated by casting material into an appropriate shape. Turbine collector 350 may be fabricated as a part of bearing housing 280, which may also be fabricated from cast iron or other suitable materials that have a high temperature capability. In this example, a further liquid cooling system may not be included.

Turbine housing 285 may also be fabricated from materials such as aluminum, and may thus further include a liquid cooling system be included in or surrounding the housing. As shown in FIG. 4, oil and coolant supply 401 may be supplied to bearing housing 280 through passages 402 integrated into the collector and bearing housing. Cooling may also be supplied with external coolant tubes and hoses. In another example, turbine housing 285 may be fabricated as a separate piece from bearing housing 280 and coupled the bearing housing with bolts or other suitable fasteners.

Turbocharger assembly 300 includes stator 322, rotor 325, turbine 62, compressor 60, compressor housing 335 and bearing housing 280. Turbine 62 may be coupled to compressor 60 via shaft 160. Stator 322 may be placed within cylinder head 175. In one example, stator 322 may be fabricated from welded pieces of stainless steel sheet metal. Stator 322 may be cast as a separate piece or cast of multiple pieces. Stator 322 may be attached with various schemes, including snap-in-place, press-in-place, or mechanically attached with bolts or v-bands. The stator may be designed to fit into a complimentary stator mount within the cylinder head that both retains the stator and prevents its rotation. In some examples, the cylinder head may act as the stator, and configured to steer and accelerate the flow of exhaust gas to a desired incidence angle and velocity.

Rotor 325 may also be placed within cylinder head 175. In one example, bearing housing 280 may be mounted via one or more dowels. The bearing housing may have a cooling passage or passages routed near the dowel mounts in order to minimize thermal distortion of the bearing housing and to ensure the rotor remains in place and maintains sufficient distance between the rotor blades and the housing so as not to incur blade rubbing and to maintain a minimum clearance necessary to preserve turbine efficiency.

Turbocharger assembly 300 may also include a gas collector 350 following the turbine. Gas collector 350 may include a torroidial passage, wherein exhaust gas may be routed from the turbine to a single outlet part of the bearing housing. Gas collector 350 may further merge with exhaust outlet 290, or may direct exhaust gas to an emissions control device or an exhaust gas recirculation system.

The bearing housing may include a plurality of bearings that may be designed for both a thrust and a radial load. The bearings may be journal bearings, ball bearings, needle bearings, air bearings, or other appropriate bearings. The turbine housing may be routed to include an oil and coolant supply, fed by a supply line 420.

Compressor 60 includes compressor housing 335, a compressor collector, an impeller, and an air inlet. The compressor impeller may be coupled to turbine 62 via shaft 160. The flow of exhaust gas though turbine 62 may drive rotational movement of drive shaft 160, which in turn drives the impeller to rotate. The air inlet delivers air to compressor 60, which is then compressed by compressor 60. Compressed air is then delivered back to intake manifold 44 through a series of conduits as described above and depicted schematically in FIG. 1.

Turbocharger assembly 300 is depicted as having a single turbine and a single turbine scroll. In another example, turbocharger assembly 300 may include more than one turbine and more than one scroll, for example a dual-scroll turbine. Turbocharger assembly 300 is depicted as having a single compressor, but may include more than one compressor. In an example system with more than one turbine, the turbines may have concentric shafts that drive a single compressor or multiple compressors. In another example, a supercharger may also be included in the vehicle system.

Figure 5A:
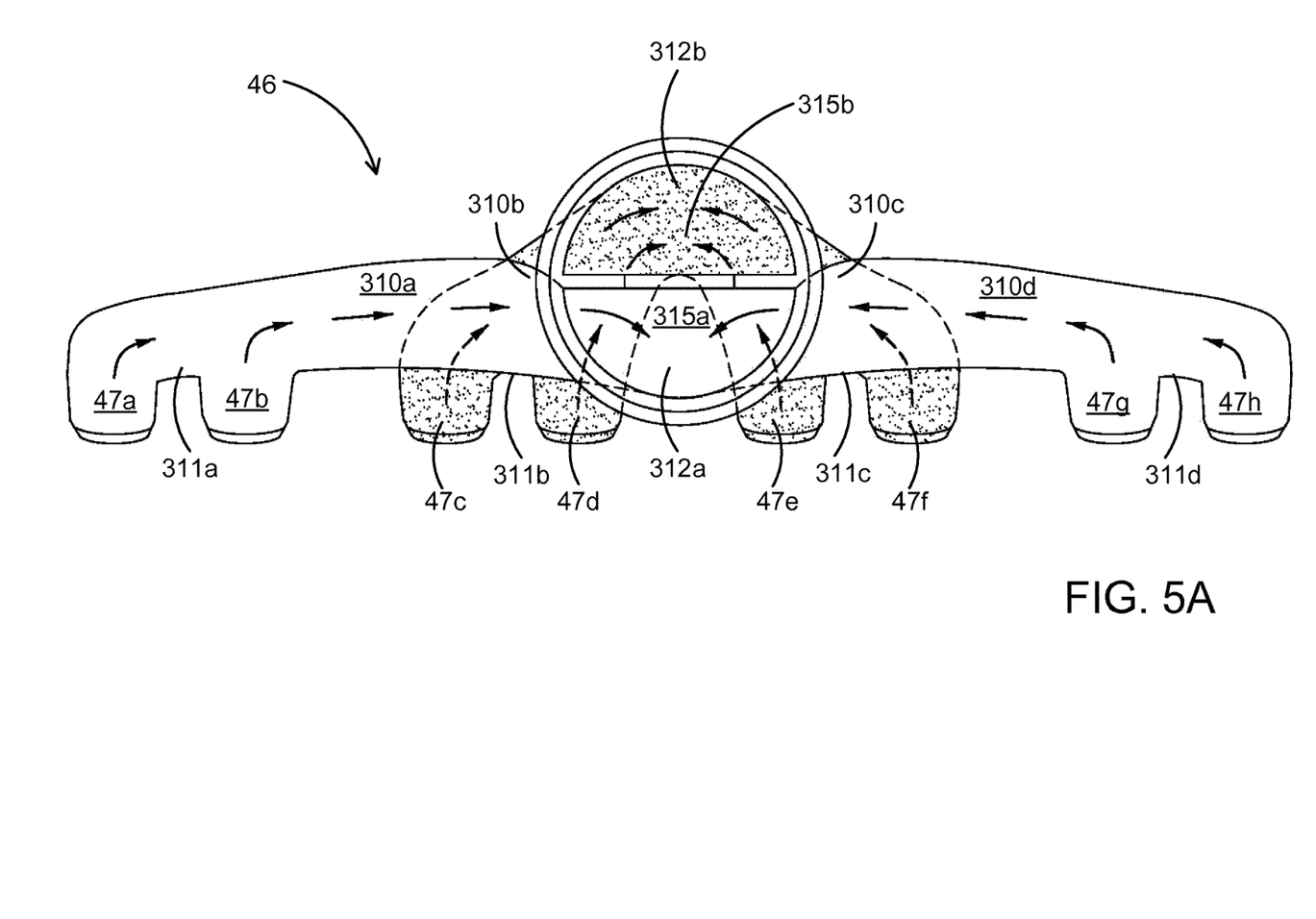
FIG. 5A shows a perspective view of an example exhaust manifold.
Figure 5B:
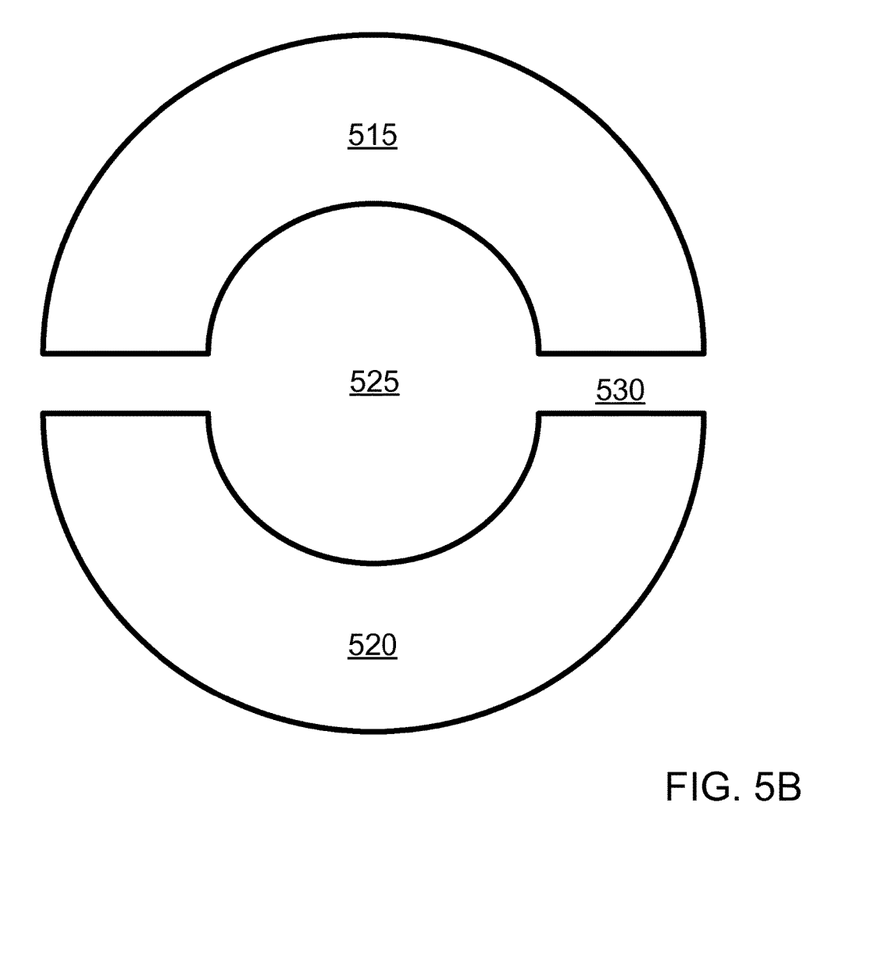
FIG. 5B shows a perspective view of the input end of an example turbine.

Turning to FIGS. 5A-5B, an exhaust manifold 46 for a 4 cylinder engine is shown in accordance with the present disclosure, which may be incorporated into the engine configurations of FIGS. 1-4. Exhaust manifold 46 may be incorporated into cylinder head 175. In one example, the engine may have a firing order of 1-3-4-2. In this example, it may increase the efficiency of exhaust gas to the turbine by separating the exhaust gas pulses such that cylinders 1 and 4 are coupled together and cylinders 2 and 3 are coupled together. In one example, cylinders 1 and 4 are coupled to a first inlet of turbine 62 and cylinders 2 and 3 are coupled to a second inlet of turbine 62. In this configuration, the exhaust gas expelled into the manifold may be less likely to backflow into the cylinders As depicted in FIGS. 5a-b, cylinder 1 may include exhaust valves coupled to exhaust ports 47a and 47b. Similarly, cylinder 1 may include exhaust valves coupled to exhaust ports 47c and 47d, cylinder 3 may include exhaust valves coupled to exhaust ports 47e and 47f, and cylinder 4 may include exhaust valves coupled to exhaust ports 47g and 47h. Exhaust ports 47a and 47b may merge at junction point 311a to form exhaust duct 310a. Similarly, exhaust ports 47c and 47d may merge at junction point 311b to form exhaust duct 310b. Exhaust ports 47e and 47f may merge at junction point 311c to form exhaust duct 310c, and exhaust ports 47g and 47h may merge at junction point 311d to form exhaust duct 310d. Exhaust runners 310a and 310d may further merge at a junction point 312a that is downstream of junction points 311a and 311d. Merging at 312a in this fashion combines the exhaust flows of cylinders 1 and 4 into exhaust output duct 315a. Exhaust output duct 315a becomes a sector of exhaust manifold 46 which feeds turbine 62. Similarly, Exhaust runners 310b and 310c may further merge at a junction point 312b that is downstream of junction points 311b and 311c. Merging at 312b in this fashion combines the exhaust flows of cylinders 2 and 3 into exhaust output duct 315b. A wastegate 26 actuated by wastegate actuator 150 may be positioned in one or more of exhaust ducts 310a, 310b, 310c and 310d, or positioned in one or more of exhaust output ducts 315a and 315b.

Merging the exhaust from cylinders 1 and 4 and cylinders 2 and 3 in this fashion may allow for exhaust pulses to be separated within the exhaust ports and may increase transient response and decrease the amount of energy lost from the exhaust gas. In the example where turbine 62 is an axial turbine, it may be possible to achieve pulse separation from exhaust valves all the way up to the point where the exhaust enters the turbine by forming exhaust output duct 315a in the shape a half-circle and forming exhaust output duct 315b in the shape of a half-circle complimentary to the half-circle of exhaust output duct 315a.

Exhaust output ducts 315a and 315b may direct exhaust gas to turbine inlet ports 515 and 520, respectively. In the example depicted in FIG. 5B, turbine inlet ports 515 and 520 are positioned such that a circle or circular shape that is within 10° of a circle is formed. The space 525 between exhaust exit ports may thus also be a circle or circular shape that is within 10° of a circle. Space 525 may be a cooled portion of the cylinder head material, for example aluminum. In this example, turbine inlet ports 515 and 520 may also include elements as needed to interact with stator 322 and rotor 325. In the example shown, the two semi-circular annular regions 515 and 520 may be spaced apart from one another via a separation region 530 that is contiguous with ends of turbine inlet ports 515 and 520. The separation region may be formed of a cooled portion of the cylinder head material. As shown, two symmetric semi-circular outlets are shown, with symmetric separation regions. However, asymmetric configurations may also be used. The outlets may be steered to achieve a turbine incidence angle most favorable for the specific turbine used. In some examples, there may be more than 2 turbine inlet ports. For example, there may be a turbine inlet port for each engine cylinder.

As shown in FIG. 5A, the particular shape of the exhaust manifold ports and convergence areas may first turn upward (with regard to vertical being parallel to a cylinder's central axis), and then bend back to a downward exit after the exhaust gasses have been merged. In this way, advantageous exhaust flow can be generated in combination with the engine firing order so that the two semi-circular annular exhaust outlets can feed the axial turbochargers input together. Other exhaust duct geometries are possible to achieve pulse separation and correct velocity and angle for the turbine inlet. For example, each cylinder may be coupled to an individual exhaust port, exhaust duct and exhaust outlet duct. In a 4-cylinder engine, there would thus be four exhaust outlet ducts. The exhaust outlet ducts may be configured with a quarter-circle outlet, the four outlets arranged in a complementary fashion to form an annular outlet leading to the exhaust gas collector or turbine inlet. Similar configurations may be utilized for 6 or 8 cylinder engines.

The systems depicted in FIGS. 1-5B may enable one or more systems. For example, a system comprising: a cylinder head having a first and second exhaust duct separately coupled to first and second groups of cylinders, each of the first and second exhaust ducts leading to an exhaust driven turbine mounted inside the cylinder head on a bearing, the bearing located within a bearing housing supported by the cylinder head. The cylinder head may further comprise cooling passages adjacent the turbine and a wastegate gas passage. The turbine may be an axial, mixed flow or radial turbine. The turbine may include one or more stages, and the stages may include one or more stator stages. The stator stages may be unique vanes or may be part of the cylinder head. Outlets of each of the first and second exhaust ducts may form a semi-circular cross-sectional coupling with a gas collector of the turbine. The two semi-circular cross-sections of each of the first and second outlets may be positioned relative to one another to form an annular combined outlet. The system may further comprise at least a third exhaust duct separately coupled to a third group of cylinders. Each of the groups of cylinders may comprise one cylinder, and each of the exhaust ducts may couple to a gas collector of the turbine. The exhaust ducts may have arc-shaped outlets that may combine to form an annular combined outlet.

In another example, A turbocharged engine comprising: a cylinder head forming two or more exhaust ducts, each with an outlet terminus at a turbine wheel or collector, an opening of the outlet terminus of a first exhaust duct being a semi-circular annular shape within 5° of a half-circle and an opening of the outlet terminus of a second exhaust output line being a semi-circular annular shape within 5° of a half-circle, the outlet termini positioned opposite one another to form a circular annulus. The exhaust duct may take the form of a variety of other configurations. The cylinder head may include exhaust ports for two or more engine cylinders. The engine cylinders may be placed in an inline, opposed or V configuration. The turbocharged engine may further comprise an axial turbine at least partially rotatably mounted in the cylinder head. Rotor and stator stages of the axial turbine may be positioned in the cylinder head. The first exhaust duct may be coupled to outer engine cylinders, and the second exhaust duct may be coupled to inner engine cylinders. The cylinder head may further comprise a wastegate passage. The turbine may be coupled to one or more compressors via a common shaft.

The systems depicted in FIGS. 1-5B may enable one or more methods. For example, a method, comprising: combining, in a cylinder head, exhaust gas from inner inline cylinders of an engine to a first semi-circular annular exit; combining, in the cylinder head, exhaust gas from outer inline cylinders of an engine to a second semi-circular annular exit positioned opposite the first semi-circular annular exit; and directing exhaust gas out of the first and second exits through an axial turbine with bearings mounted in the cylinder head. The axial turbine may be coupled to a radial compressor through a common shaft. The method may further comprise adjusting a wastegate valve to adjust flow through a wastegate line positioned in the cylinder head.

It will be appreciated that the configurations and routines disclosed herein are exemplary in nature, and that these specific embodiments are not to be considered in a limiting sense, because numerous variations are possible. For example, the above technology can be applied to V-8, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
a cylinder head for a first group of outer cylinders and a second group of inner cylinders, the system including the cylinders, where each cylinder of the first group of outer cylinders and the second group of inner cylinders is coupled to one exhaust duct within the cylinder head, exhaust ducts coupled to the first group of cylinders merging only into a fluidically combined first exhaust output duct and exhaust ducts coupled to the second group of cylinders merging only into a fluidically combined second exhaust output duct, the first and second exhaust output ducts leading to first and second inlet ports with arc-shaped outlets and a circular shaped space formed between the arc-shaped outlets, respectively, of an exhaust driven turbine mounted inside the cylinder head on a bearing within a bearing housing supported by the cylinder head.

2. The system of claim 1, wherein the first and second exhaust output ducts are spaced apart from one another, wherein each of the first and second inlet ports are semi-circular annular regions that are positioned to collectively form an annular shape.

3. The system of claim 2, wherein the bearing housing is mounted to the cylinder head via one or more dowels inserted into one or more dowel mounts, and wherein the cylinder head further comprises cooling passages adjacent the dowel mounts.

4. The system of claim 2, wherein the turbine is an axial turbine, wherein the turbine includes two or more stages, and where the stages include one or more stator stages, and wherein there are four total cylinders including two outer cylinders, one on each end, and two inner cylinders each adjacent one another and between the two outer cylinders.

5. The system of claim 4, wherein one or more of the stator stages are fabricated as part of the cylinder head and inserted into the circular shaped space formed between the first and second inlet ports.

6. The system of claim 2, wherein the arc-shaped outlets of each of the first and second exhaust output ducts form a semi-circular cross-sectional coupling with a gas collector of the turbine, and wherein the turbine is centrally located between the inner cylinders along a central axis of the cylinder head, the inner and outer cylinders aligned along the central axis.

7. The system of claim 6, wherein two semi-circular cross-sections of each of the first and second outlets are positioned relative to one another to form an annular combined outlet.

8. The system of claim 2, further comprising at least a third exhaust output duct separately coupled to a third group of cylinders.

9. The system of claim 8, where each of the groups of cylinders comprises one cylinder, and each of the exhaust ducts couples to a gas collector of the turbine.

10. The system of claim 1, wherein only two arc-shaped outlets combine to collectively form an annular combined outlet, the first inlet port below the second inlet port and positioned between the inner cylinders along a central axis of the cylinder head.

11. A turbocharged engine, comprising:
a cylinder head forming two or more exhaust output ducts, each with an outlet terminus located at a turbine wheel or collector, an opening of a first outlet terminus of a first exhaust output duct being a semi-circular annular shape within 5° of a half-circle positioned above an opening of a second outlet terminus of a second exhaust output duct being a semi-circular annular shape within 5° of a half-circle, the first and second outlet termini positioned opposite and spaced apart from one another to form a circular annulus, each outlet terminus of the first and second outlet termini coupled to a separate turbine inlet port of a first turbine inlet port and a second turbine inlet port, the first and second turbine inlet ports each being arc-shaped and positioned to collectively form an annular shape within 10° of a circle, wherein exhaust ducts from outside cylinders on each side of the cylinder head fluidically merge to form the second exhaust output duct and exhaust ducts from inside cylinders between the outside cylinders pass to above the exhaust ducts from outside cylinders and fluidically merge to form the first exhaust output duct.

12. The turbocharged engine of claim 11, where the cylinder head includes exhaust ports for two or more engine cylinders, the engine cylinders including the inside cylinders and the outside cylinders.

13. The turbocharged engine of claim 12, where the engine cylinders are placed in an inline, opposed, or V configuration, and wherein the first and second turbine inlet ports are separated by a space that is an annular shape within 10° of a circle, the space comprising a cooled portion of cylinder head material.

14. The turbocharged engine of claim 13, further comprising an axial turbine at least partially rotatably mounted in the cylinder head, and wherein the turbine inlet ports are spaced apart by a separation region that is contiguous with ends of the turbine inlet ports, the separation region comprising a cooled portion of cylinder head material.

15. The turbocharged engine of claim 14, wherein rotor and stator stages of the axial turbine are positioned in the cylinder head and inserted into the space.

16. The turbocharged engine of claim 15, wherein the first exhaust output duct is coupled only to the outside cylinders, and the second exhaust output duct is coupled only to the inside cylinders.

17. The turbocharged engine of claim 16, wherein the cylinder head further comprises a wastegate passage.

18. The turbocharged engine of claim 17, where the turbine is coupled to one or more compressors via a common shaft.

19. A method, comprising:
fluidically combining, in a cylinder head, exhaust gas from inner inline cylinders of an engine only to a first semi-circular annular exit;
directing, in the cylinder head, exhaust gas from outer inline cylinders of the engine into exhaust ducts such that the exhaust gas initially travels towards an upper face of the cylinder head;
fluidically combining, in the cylinder head, exhaust gas from the outer inline cylinders of the engine only to a second semi-circular annular exit positioned opposite the first semi-circular annular exit such that the exhaust gas travels towards a lower face of the cylinder head in order to reach the second semi-circular annular exit, the second semi-circular annular exit below the first semi-circular annular exit, the opposing first and second semi-circular exits positioned between the inner cylinders along a central axis of the cylinder head; and
directing exhaust gas out of the first and second exits through first and second inlet ports, respectively, of an axial turbine with bearings mounted in a side wall of the cylinder head.

20. The method of claim 19, where the axial turbine is coupled to a radial compressor through a common shaft, wherein the first and second semi-circular annular exits are spaced apart from one another, and wherein the first and second inlet ports are semi-circular annular regions that are separated by a circular shaped space that is within 10° of a circle.

21. The method of claim 20, further comprising adjusting a wastegate valve to adjust flow through a wastegate line positioned in the cylinder head.

* * * * *